United States Patent [19]

Walter et al.

[11] Patent Number: 4,729,669

[45] Date of Patent: Mar. 8, 1988

[54] LINEAR BALL BEARING FOR CARRIAGE OF MACHINE TOOL

[75] Inventors: Lothar Walter, Schweinfurt; Uwe Mayer, Münnerstadt; Zoltan Laszlofalvi, Schweinfurt, all of Fed. Rep. of Germany

[73] Assignee: SKF Linearsysteme GmbH, Schweinfurt, Fed. Rep. of Germany

[21] Appl. No.: 934,172

[22] Filed: Nov. 21, 1986

[30] Foreign Application Priority Data

Nov. 30, 1985 [DE] Fed. Rep. of Germany ....... 3542478

[51] Int. Cl.$^4$ .............................................. F16C 29/06
[52] U.S. Cl. ..................................................... 384/45
[58] Field of Search ............................. 384/45, 44, 43; 464/168

[56] References Cited

U.S. PATENT DOCUMENTS 4,497,522 2/1985 Szenger ................................. 384/45
4,552,416 11/1985 Lehmann et al. ..................... 384/45
4,615,569 10/1986 Hirata ..................................... 384/45

Primary Examiner—Lenard A. Footland
Attorney, Agent, or Firm—Rosen, Dainow & Jacobs

[57] ABSTRACT

A linear ball bearing for a carriage in a machine tool has a support with a pair of raceways which oppose a corresponding pair of raceways formed in the carriage. Two endless rows of balls are arranged to circulate in adjacent planes, with the loaded balls rolling between the opposing raceways. One or two rails are fastened to the support for guiding the loaded balls outwardly of the support. The loaded balls of one row mesh in the interstices of the loaded balls of the other row. Each rail has a guiding web for laterally guiding the loaded balls and at least one retaining web for partly encompassing the loaded balls. The longitudinal gaps between the rail and the support have widths less than the ball diameter, thereby blocking the balls from falling out of the support when the bearing is disassembled.

16 Claims, 5 Drawing Figures

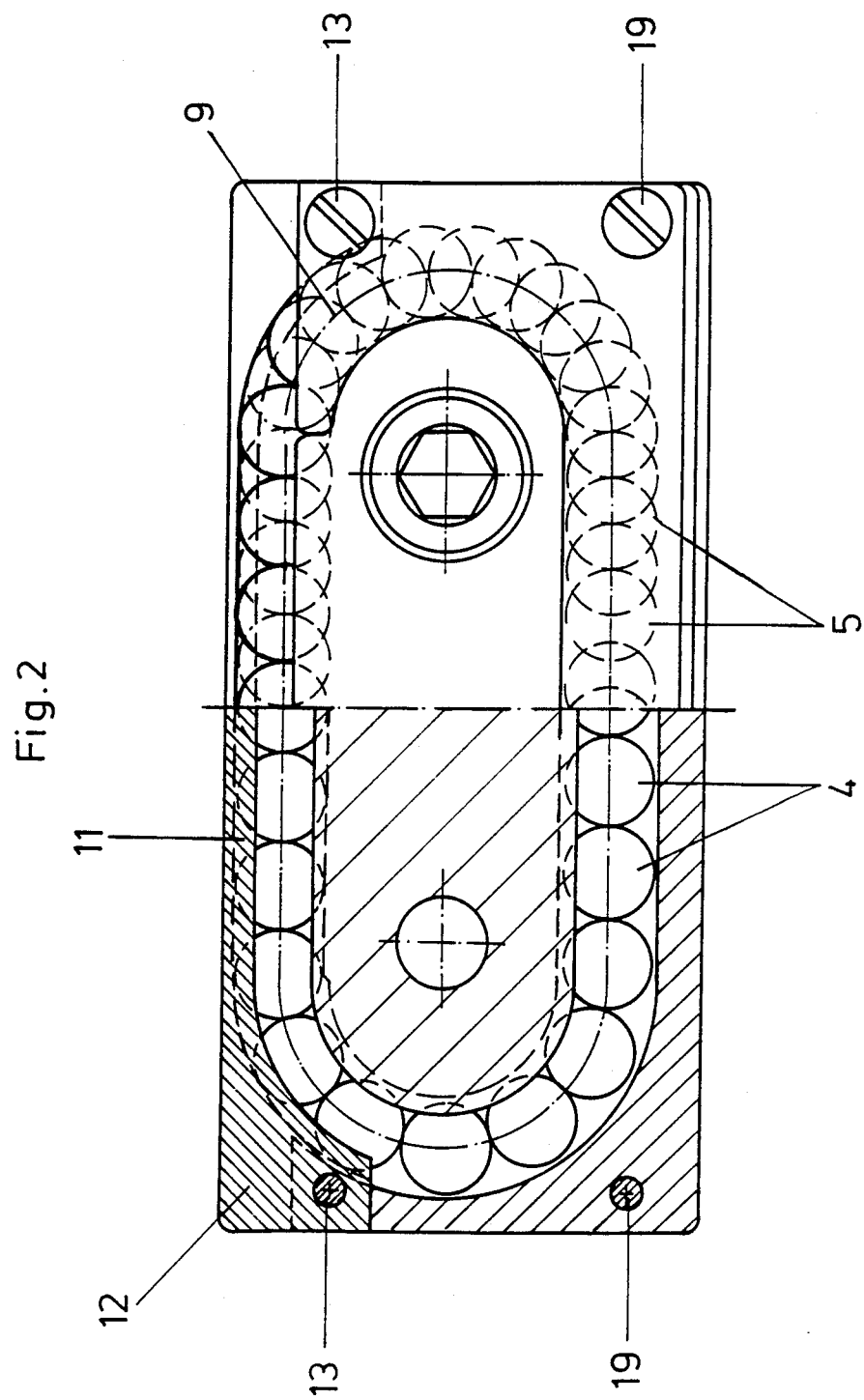

LINEAR BALL BEARING FOR CARRIAGE OF MACHINE TOOL

FIELD OF THE INVENTION

The invention relates to a linear ball bearing for the carriage of a macine tool or the like having two endless rows of balls and a rail fastened to a support for guiding the loaded balls.

BACKGROUND OF THE INVENTION

A linear ball bearing of the foregoing type is shown in DE-PS No. 1258670, wherein intermediate balls are arranged between the loaded balls of two rows, which are in turn outwardly guided by a rail fastened to the support. This known linear ball bearing has the disadvantage that the arrangement of the loaded balls, the intermediate balls, and the rail takes up a relatively large amount of space which is not always available. In addition, this prior art linear ball bearing is very costly to construct and assemble because of the non-load-carrying intermediate balls arranged in the support in addition to the load-carrying balls.

Another linear ball bearing is disclosed in DE-PS No. 2247456, wherein only the loaded balls of the two adjacent rows are displaced relative to each other, so that the loaded balls of one row mesh in the interstices of the loaded balls of the other row. Thereby more than two rows of balls are arranged in a shaft-surrounding sleeve as support. The loaded balls of this linear ball bearing cannot be arranged in two parallel adjacent raceways of a carriage.

SUMMARY OF THE INVENTION

The object of the invention is to provide a linear ball bearing which can be compactly built and is moreover economical to manufacture.

The object is achieved in accordance with the invention such that all balls in two parallel adjacent rows are arranged to mutually engage in a manner similar to gear toothing so that mutual guidance of the balls for relatively high load-carrying capacity of the linear ball bearing is obtained. The balls thus occupy an extremely narrow lateral constructional space. In one preferred embodiment, inasmuch as the rail, which has relatively high rigidity, is arranged to project into the outer interstitial space between the loaded balls of the two rows, the outer walls of the retaining edge on either side of a longitudinal guiding rib and directly connected thereto are arranged to project only slightly over the contour of the loaded balls. Consequently, the linear ball bearing has an advantageously stout constructional form in the direction of the carriage. Moreover, the linear ball bearing according to the invention comprises a few economically manufactured constructional elements which can be simply assembled.

In accordance with a further feature of the invention, the loaded balls in the linear ball bearing are guided by relatively large guiding surfaces along the rail.

Further, the loaded balls of the two rows are guided mutually and along the longitudinal raceways with close fit against the rail.

In a further embodiment the loaded balls of both rows are seated without play.

In accordance with all of the embodiments, the loaded balls of the improved linear ball bearing, when the carriage is removed, will not fall out of the channels of the support, being held in place by the rail.

The linear ball bearing consequently takes the form of a self-locking ready-for-service modular unit which can be provided with balls and can be greased and lubricated in the manufacturing plant.

BRIEF DESCRIPTION OF THE DRAWINGS

The preferred embodiments according to the invention will hereinafter be described in detail with reference to the following drawings:

FIG. 2 is a partial sectional view along the line A-A shown in FIG. 1 of the linear ball bearing in the disassembled condition.

DETAILED DESCRIPTION OF THE PREFERRED EMBODIMENTS

Figure 1:
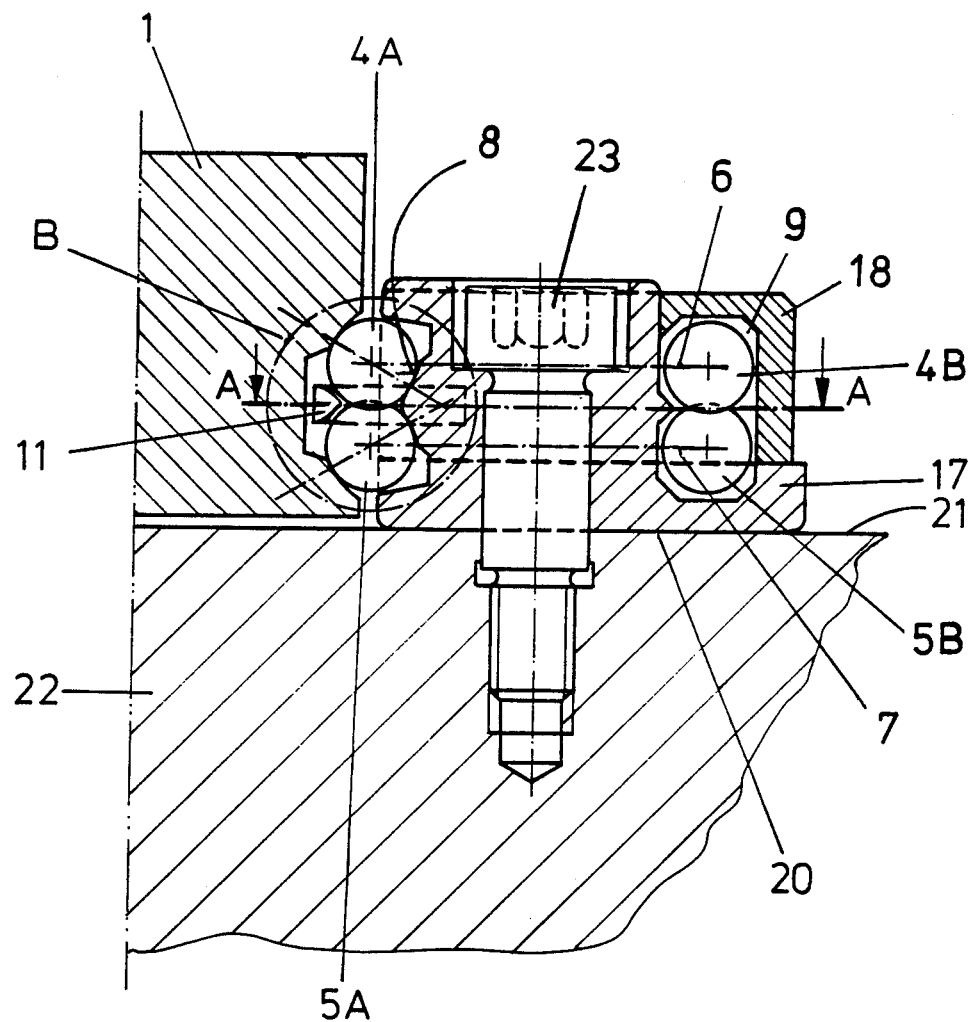
FIG. 1 is a cross-sectional view of a linear ball bearing according to the invention, built on one of the two sides of a carriage.
Figure 3:
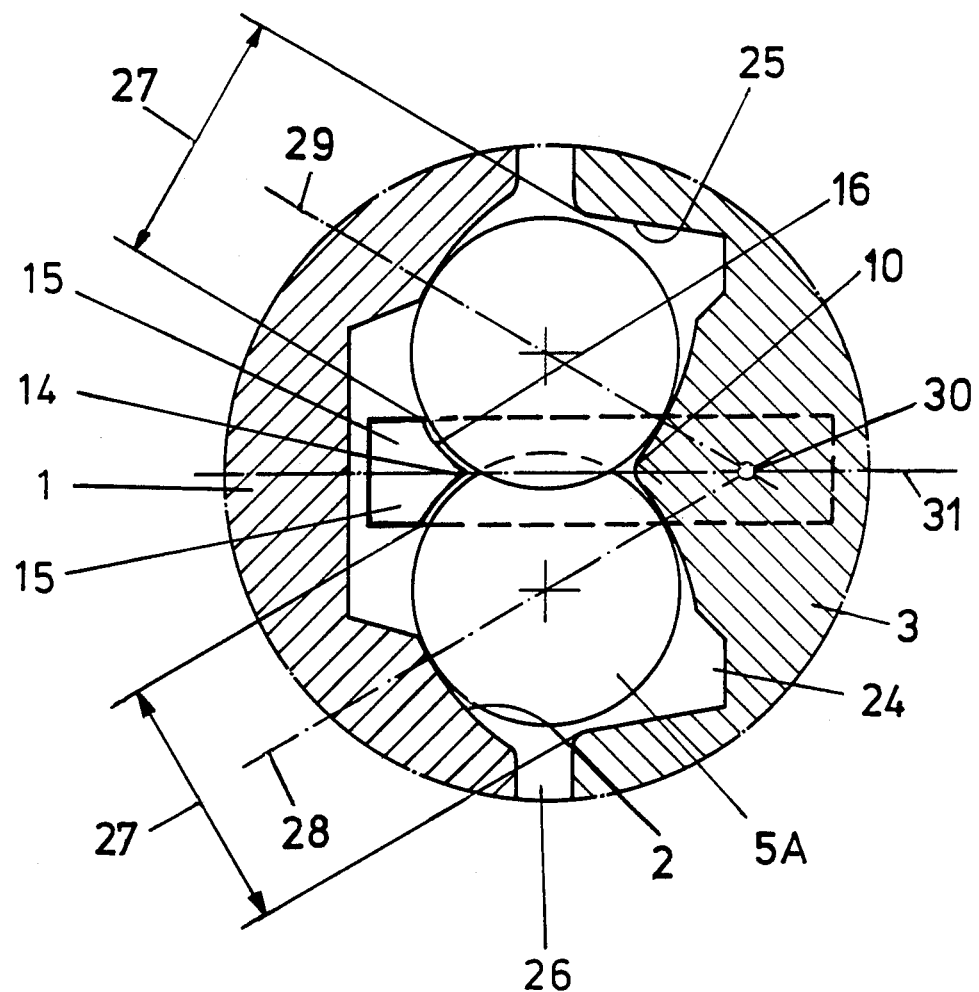
FIG. 3 is an enlarged cross-sectional view of the cutout portion B of FIG. 1 of a preferred embodiment of the invention.

Numeral 1 in FIGS. 1-3 denotes the carriage of a machine tool or the like (not shown). The carriage 1 has two adjacent longitudinal raceways 2 on two of its sides (only one of which is shown) for the loaded balls 4A, 5A which are inserted in a molded support 3 of a linear ball bearing. The loaded balls 4A, 5A belong to two endless rows of balls 4, 5, which rows are arranged in respective adjacent circulation planes. The rows of balls are inserted in respective ball guideways 6, 7 of support 3. The circulation planes of the two rows of balls extend substantially parallel to each other.

The ball guideways 6, 7 of support 3 each comprise a longitudinal raceway 8 for the loaded balls 4A, 5A opening outwardly toward the corresponding raceway 2 on the carriage and a return or reversal raceway 9 for the respective unloaded balls 4B, 5B, each reversal raceway connecting the two ends of the corresponding raceway 8 with each other and encircling the balls at least in part from the outside. Hereinafter the term "outside" is used to mean the space on the outer periphery of the endless rows of balls and the term "inside" is used to mean the space on the inner periphery of the endless rows of balls.

The two longitudinal raceways 8 are groove-shaped and have profiles which closely conform to the balls 4, 5. The raceways 8 are incorporated on respective sides of a common raceway rib 10 of support 3 and consequently are laterally inwardly (toward one another) offset relative to the centers of the loaded balls 4A, 5A. The raceway rib 10 lies in the middle between the two raceways 2 of carriage 1 and partly projects outwardly from the inside between the loaded balls 4A, 5A of the two rows of balls.

The loaded balls 4A and unloaded balls 4B tightly arrayed in succession in one of the rows of balls mesh in the interstices of the loaded balls 5A and unloaded balls 5B tightly arrayed in succession in the other row so that the balls of row 4 and the balls of row 5 are mutually interleaved.

A rail 11 is arranged over the raceways 8 of the raceway rib 10, rail 11 being made of an abrasion-resistant molybdenum sulfide or lubricant-impregnated plastics material. The longitudinal ends 12 of rail 11 have increased height toward the support 3, as shown in FIG. 2, to extend partly over the return raceway 9. Each end 12 is fastened to the support 3 by means of a screwed-in bolt 13 extending transverse to the longitudinal direction of the support 3.

The rail 11 has a longitudinal guiding rib 14 which opposes the raceway rib 10 and projects inwardly from the outside between the loaded balls 4A, 5A of the two rows for engaging and laterally guiding the loaded balls 4A, 5A (see FIG. 3).

On each side of the guiding rib 14 the rail 11 has a longitudinal retaining rib 15, directly connected to the guiding edge 14 and in part encompassing the loaded balls 4A, 5A of the respective rows from outside.

The guiding rib 14 as well as both retaining edges 15 of the rail 11 define a longitudinal guiding surface 16 of concave arched profile which closely conforms to the contour of the loaded balls 4A, 5A of the respective rows and faces of the loaded balls 4A, 5A with extremely small play.

The support 3 comprises a base 17 and a cover 18 (shown in FIG. 1 from top to bottom) which is removable from the base 17 and which tightly covers the reversal raceway 9 of the support 3 from outside the rows. The base 17 is made of hardened steel and the cover 18 is made of a relatively soft, but abrasion-resistant cast material. The cover 18 is secured to the base 17 by means of fastening bolts 19 extending transverse to the longitudinal direction of the support.

On the underside (as seen in FIG. 1) the base 17 has a planar supporting surface 20 which lies against the planar mounting surface 21 of the machine block 22 of the machine tool. The linear ball bearing is secured in its prescribed position on the machine block 22 by two bolts 23, which pass through and engage corresponding holes in the base 17 and are screwed into corresponding threaded holes in the machine block 22.

The loaded balls 4a, 5A of the two rows of balls are each arranged in respective longitudinal channels 24 of the support 3. Each channel 24 has a laterally outer side wall 25 (i.e. away from the rib 10), the outer rim of which forms an outwardly directed longitudinal gap 26 with the opposing retaining edge 15. The loaded balls 4A, 5A extend in part toward the outside through these longitudinal gaps 26 and come into working contact with the respective raceways 2 of the carriage 1. Each longitudinal gap 26 has a width 27 which is smaller than the diameter of the loaded balls 4A, 5A extending through the longitudinal gap 26.

The loaded balls 4A, 5A in the foregoing case are arranged between the respective raceways 2 and raceways 8 such that the planes defined by the axes 28 of load transmission of the balls of one row of balls and the axes 29 of load transmission of the balls of the other row of balls converge in the direction toward support 3 from opposite sides thereof.

All of the balls 4A, 4b, 5A, 5B have substantially the same diameter and the planes of the axes 28, 29 of load transmission of the balls of the two rows, which extend radially through the balls, intersect at a line formed by points 30 which lie in the longitudinal central plane 31 of the support, which in turn lies between the parallel circulation planes of the two rows of balls.

Figure 4:
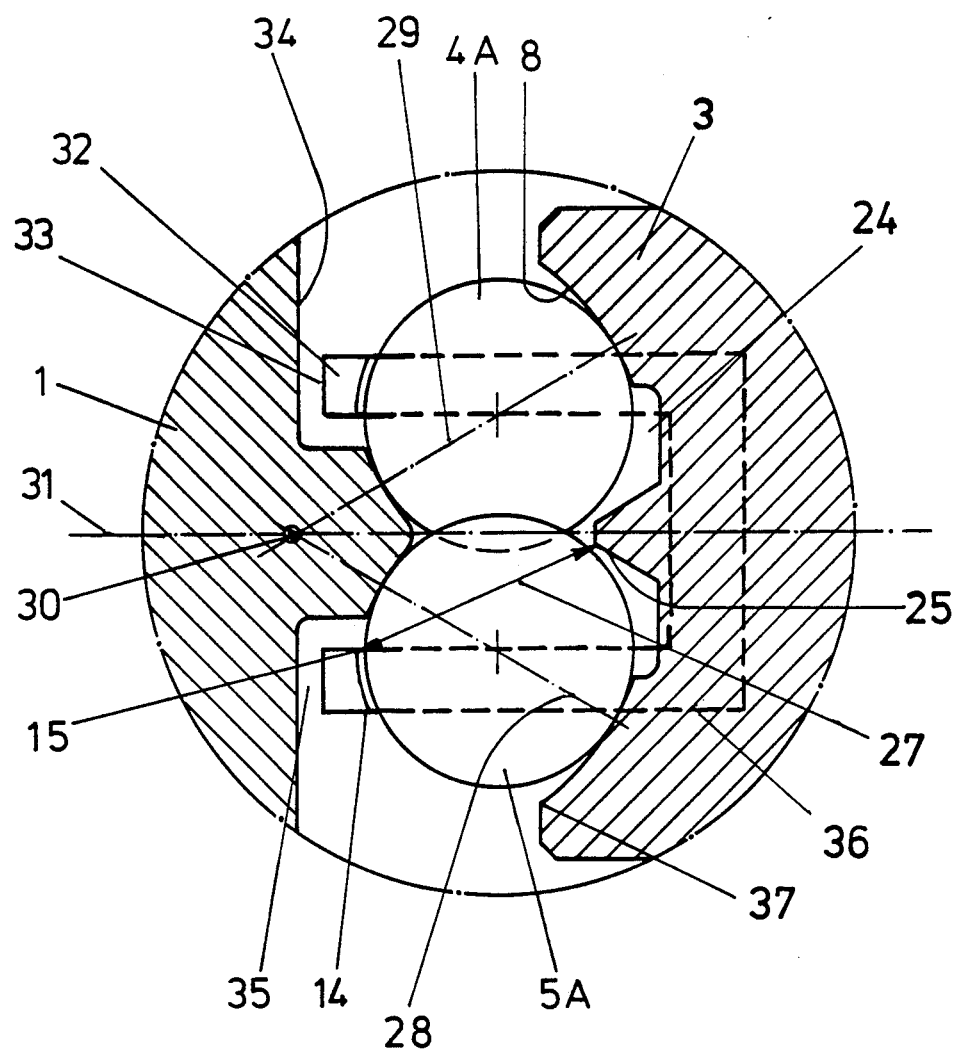
FIG. 4 is an enlarged cross-sectional view of the cutout portion B of FIG. 1 of a further preferred embodiment of the invention.

In FIG. 4 a modified linear ball bearing is shown in which pairs of rails 32 are provided, which rails are respectively arranged on the outer periphery of the loaded balls 4A, 5A of the respective rows. Each rail 32 has a longitudinal guiding rib 14 on its laterally outer side (i.e. away from the other rail) for laterally guiding the loaded balls 4A, 5A of the opposing row and a longitudinal retaining edge 15 on its laterally inner side (i.e. toward the other rail) directly connected to the guiding rib 14 for partly encompassing from the outside the corresponding loaded balls 4A, 5A.

A narrow gap seal 35 is formed between a planar longitudinal outer surface 33 of each rail 32 and an opposing longitudinal limiting surface 34 of carriage 1.

The raceways 8 of support 3 are formed as grooves and arranged laterally outwardly displaced relative to the central plane 31 of the support. The loaded balls 4A, 5A are arranged between the respective raceways 8 and the corresponding raceways 2 on the carriage such that the planes defined by the axes 28 of load transmission of the loaded balls 5A of one row and the axes 29 of load transmission of the loaded balls 4A of the other row diverge in the direction toward the support 3.

The two rails 32 are integrally connected to each other by means of transition members 36 connecting their longitudinal ends and are fastened to the support 3 by means of bolts (not shown) through these transition members 36.

The balls of the two rows have substantially equal diameters. The planes of the axes 28, 29 of load transmission of the two rows are arranged such that they intersect at a line formed by points 30, which lie in the longitudinal central plane 31.

In the embodiment of FIG. 4, the loaded balls 4A, 5A of each row are respectively arranged in longitudinal channels 24 of support 3. Each channel 24 has a laterally inner side wall 25, the outer rim of which forms an outwardly directed inner longitudinal gap with the opposing retaining edge 15. Each inner longitudinal gap has a width 27 which is smaller than the diameter of the balls 4A, 5A which partly protrude through the respective longitudinal gap toward the outside.

Between the guiding rib 14 of each rail 32 and an outer rim 37 of the corresponding raceway 8 is also formed an outer longitudinal gap, the width of which is also somewhat smaller than the diameter of the balls 4A, 5A.

Figure 5:
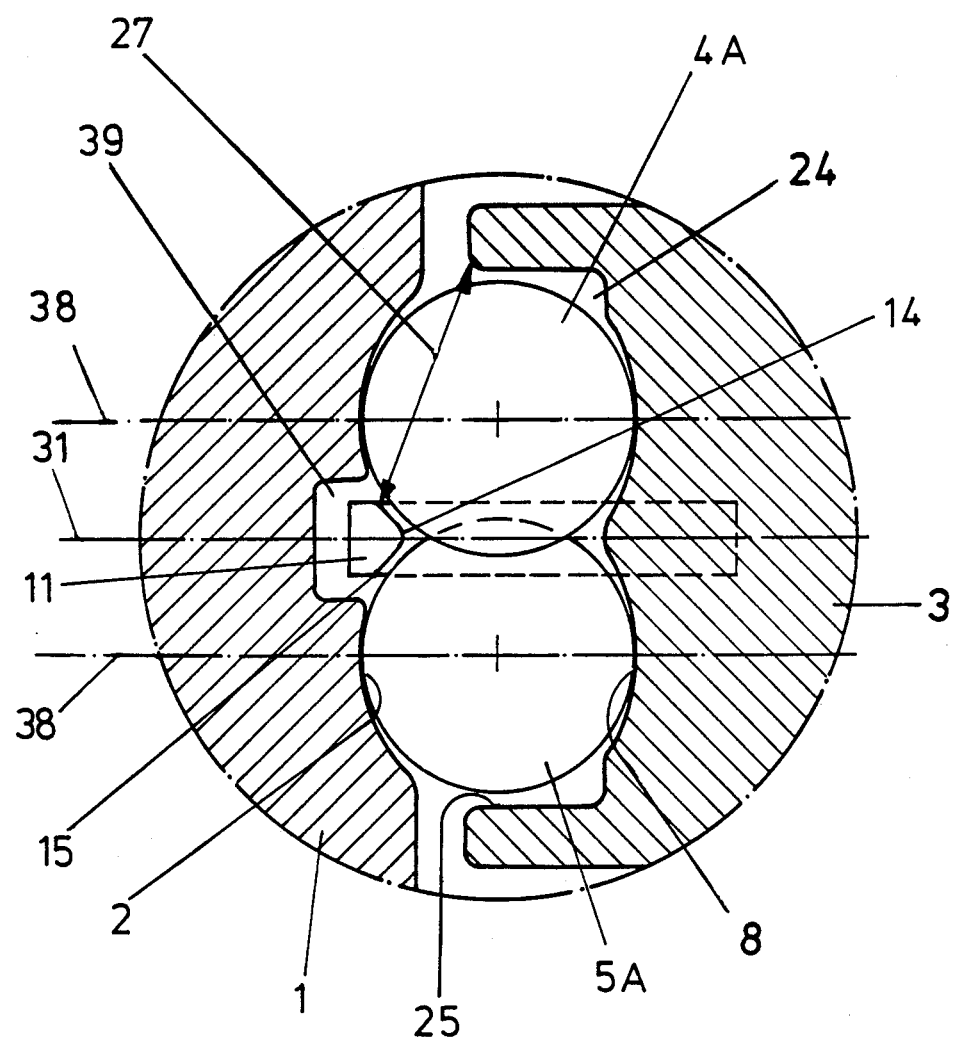
FIG. 5 is an enlarged cross-sectional view of the cutout portion B of FIG. 1 for a third preferred embodiment of the invention.

FIG. 5 shows a further embodiment of the linear ball bearing according to the invention wherein the axes 38 of load transmission of both rows of balls are parallel to the longitudinal central plane 31, so that the plane of the axes 38 of load transmission of one row does not intersect the axes 38 load transmission of the other row. At the same time the raceways 8 of the support 3 as well as the raceways 2 of the carriage 1 are formed as grooves having profiles which are segments of circles and which closely conform to the contour of the balls of the respective rows. A longitudinal groove 39 which receives the rail 11 is formed between the two raceways 2 of the carriage 1.

In the embodiment of FIG. 5, the rail 11 has a longitudinal guiding rib 14 which partly projects inwardly into the space between the loaded balls 4A, 5A of the two rows from the outside for engaging and laterally guiding the balls 4A and 5A from a zone proximal to the central plane 31. On both sides the guiding rib 14 has a directly connected longitudinal retaining edge 15 whic partly encompasses the loaded balls 4A, 5A from the outside.

The loaded balls 4A, 5A of each row travel in respective longitudinal channels 24 of the support 3. Each channel 24 has a laterally outer side wall 25, the outer rim of which forms an outwardly directed longitudinal gap with the opposing retaining edge 15 of the rail 11. This longitudinal gap has a width 27 which is smaller than the diameter of the balls 4A, 5A which partly project outwardly through the gap toward the raceways 2.

It will be obvious to those of ordinary skill in the art that the above-described embodiments can be modified within the scope of the invention. For example, the rails can be formed to bend elastically and arranged so that the retaining edges and/or the guiding ribs contact the loaded balls of the respective rows with prestress. The loaded balls of the respective linear ball bearings are then adjusted to be free of play so that the balls undergo few impacts against the guiding surfaces of the rail during transport of the linear ball bearing or in operation.

In addition, the rail need not be connected at both ends to the support but rather the rail can simply be permanently connected to the support at only one of the two longitudinal ends, for example, by means of adhesive or welding.

It is not necessary that the loaded balls of the two rows be closely packed one after another. The loaded balls of one row can be arranged in the interstices between the loaded balls of the other row such that the successive loaded balls of each row are held apart at a small itnerval by the intervening loaded balls of the adjacent row. In this way the balls of the respective rows roll laterally closer together and the amount of lateral space loaded by the balls in the support is further reduced. For the same loaded length of the linear ball bearing, ie. for the same raceway length, this modification results in a smaller load capacity because per unit length of loaded raceway, fewer balls are carrying the load.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed.

What is claimed is:

1. In a linear ball bearing comprising a carriage having first and second adjacent longitudinal races, said linear ball bearing having a support with first and second guideways for receiving first and second endless rows of balls arranged to circulate in adjacent planes, whereby said first and second guideways respectively include first and second longitudinal raceways for loaded balls with open sides toward said first and second carriage races, respectively, and first and second reversal raceways for at least partly enclosing unloaded balls, said reversal raceways respectively connecting the ends of said first and second raceways for carrying loaded balls, and guide means fastened to said support to extend over said first and second raceways for loaded balls for guiding the loaded balls from the sides thereof away from said first and second raceways, the improvement wherein the balls of said first row and second row are arranged with the successive balls of each row laterally meshing in the interstices of the successively arranged balls of the other row and wherein said guide means comprises a longitudinally extending guiding rib arrangement having at least a first rib for laterally guiding the loaded balls, said rib being directly connected to a longitudinal retaining edge of said guide means for partly encompassing the loaded balls, said raceways for loaded balls partially surrounding said balls.

2. The linear ball bearing as defined in claim 1, wherein said guide means comprises rail means arranged centrally between the circulation planes of said endless rows, said rail means comprising a rail, said guiding rib comprising a longitudinal guiding rib partly projecting from outwardly of the support into the outer space between the loaded balls of said first endless row and laterally guiding the loaded balls from said outer space, and said retaining edge comprising first and second longitudinal retaining edges respectively formed on the sides of said rail and directly connected to said guiding rib for partly encompassing the loded balls of said respective rows.

3. The linear ball bearing as defined in claim 2, wherein the loaded balls of said first and second rows are respectively arranged in first and second longitudinal channels formed in said support, each of said channels having a side wall the outer rim of which faces a corresponding one of said retaining ribs, said facing outer rims and retaining edges defining a pair of longitudinal gaps through which the loaded balls of respective rows partly project outwardly, the width of each longitudinal gap being smaller than the diameter of the balls in the corresponding row.

4. The linear ball bearing as defined in claim 1, wherein said guide means comprises first and second rails respectively arranged on the outer periphery of the loaded balls of said respective rows, each of said rails having first and second ends respectively connected by first and second members, said guiding rib arrangement further comprising a second longitudinal guiding rib, said first and second ribs respectively formed on the laterally outer sides of said first and second rails for laterally guiding the loaded balls of said respective rows, and said retaining edge means comprising first and second longitudinal retaining edges respectively formed on the laterally inner sides of said first and second rails and respectively directly connected to said first and second guiding ribs for partly encompassing the loaded balls of said respective rows.

5. The linear ball bearing as defined in claim 4, wherein the loaded balls of said first and second rows are respectively arranged in first and second longitudinal channels formed in said support, each of said channels having a side wall the outer rim of which faces a corresponding one of said retaining edges, said facing outer rims and retaining edges defining a pair of inner longitudinal gaps through which the loaded balls of respective rows partly project outwardly, the width of each inner longitudinal gap being smaller than the diameter of the balls in the corresponding row.

6. The linear ball bearing as defined in claim 5, wherein each of said raceways of said support has an outer rim which opposes a corresponding one of said guiding ribs, said opposing outer rims of said raceways and guiding ribs defining a pair of outer longitudinal gaps through which the loaded balls of the respective rows partly project outwardly, the width of each outer longitudinal gap being smaller than the diameter of the balls in the corresponding row.

7. The linear ball bearing as defined in claim 1, wherein said guiding rib and said retaining edge define guiding surfaces between them which coform to the contour of the balls of said respective rows.

8. The linear ball bearing as defined in claim 7, wherein said guiding surfaces face the loaded balls of said respective rows with little play therebetween.

9. The linear ball bearing as defined in claim 1, wherein said guide means is elastically bendable and is arranged with at least one of said retaining edge means and guiding rib contacting the loaded balls of the respective rows with prestress.

10. The linear ball bearing as defined in claim 1, wherein at least one longitudinal end of said guide means is connected to said support by means of a bolt.

11. The linear ball bearing as defined in claim 1, wherein the loaded balls are arranged between the corresponding races of said carriage and raceways of said support with the planes formed by the axes of load transmission of the loaded balls of said first and second rows intersecting in said support.

12. The linear ball bearing as defined in claim 11, wherein the balls of said first and second rows have the same diameter and planes formed by the axes of load transmission of the two rows intersect in a central plane lying between the respective planes of circulation of said first and second rows.

13. The linear ball bearing as defined in claim 1, wherein the loaded balls are arranged between the corresponding races of said carriage and raceways of said support with the planes formed by the axes of load transmission of the loaded balls of said first and second rows intersecting in said carriage.

14. The linear ball bearing as defined in claim 13, wherein balls of said first and second rows have the same diameter and the planes formed by the axes of load transmission of the two rows intersect in a central plane lying between the respective planes of circulation of said first and second rows.

15. The linear ball bearing as defined in claim 1, wherein said raceways of said support comprise grooves having a profile closely conforming to the contour of the balls of said respective rows.

16. The linear ball bearing as defined in claim 1, wherein the balls of each of said rows are tightly arranged in succession.

* * * * *